_(12)_ United States Patent
Andreev et al.

(10) Patent No.: US 7,733,785 B2
(45) Date of Patent: Jun. 8, 2010

(54) METHOD AND SYSTEM FOR DYNAMICALLY ADJUSTING PACKET SIZE TO DECREASE DELAYS OF STREAMING DATA TRANSMISSIONS ON NOISY TRANSMISSION LINES

(75) Inventors: Dmitry Andreev, Port Chester, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 11/669,348

(22) Filed: Jan. 31, 2007

(65) Prior Publication Data

US 2008/0181259 A1    Jul. 31, 2008

(51) Int. Cl.
*G01R 31/08*  (2006.01)
*H04J 3/16*   (2006.01)
*H04J 3/24*   (2006.01)

(52) U.S. Cl. .............. 370/238; 370/470; 370/472; 370/474

(58) Field of Classification Search .............. None
See application file for complete search history.

(56) References Cited

U.S. PATENT DOCUMENTS

| | | | |
|---|---|---|---|
| 4,841,526 A * | 6/1989 | Wilson et al. | 714/748 |
| 6,370,163 B1 | 4/2002 | Shaffer et al. | |
| 6,886,040 B1 | 4/2005 | Fitzgerald | |
| 6,956,867 B1 * | 10/2005 | Suga | 370/465 |
| 6,977,945 B1 | 12/2005 | Noda et al. | |
| 7,349,330 B1 * | 3/2008 | Hayakawa et al. | 370/229 |

(Continued)

FOREIGN PATENT DOCUMENTS

EP    1175034 A    1/2002

(Continued)

OTHER PUBLICATIONS

Nagamalai, et al.; V-TCP: A Novel TCP Enhancement Technique for Wireless Mobile Environments; pp. 122-131; Cheeha Kim (Ed.); Information Networking; Convergence in Broadband and Mobile Networking; International Conference, ICOIN 2005; Jeju Island, Korea, Jan. 31-Feb. 2, 2005.

(Continued)

*Primary Examiner*—Kwang B Yao
*Assistant Examiner*—Jutai Kao
(74) *Attorney, Agent, or Firm*—Schmeiser, Olsen & Watts; William E. Schiesser

(57) ABSTRACT

A method and system for dynamically adjusting packet size to decrease a delay of a streaming data transmission. A measurement is obtained by a measuring computing unit (i.e., data transmission server or client computing unit). The first measurement is either (1) a delay of a streaming data transmission being sent from the data transmission server to the client computing unit via a plurality of packets or (2) a frequency of damaged packets of the plurality of packets. The damaged packets contribute to the delay of the streaming data transmission. The packet size is adjusted by the data transmission server. The packet size adjusting includes utilizing the measurement and facilitating a reduction of the streaming data transmission delay. The delay results from noise on one or more communication link segments used by the streaming data transmission.

28 Claims, 7 Drawing Sheets

U.S. PATENT DOCUMENTS

| | | |
|---|---|---|
| 2001/0023454 A1 | 9/2001 | Fitzgerald |
| 2002/0103915 A1 | 8/2002 | Shuster |
| 2004/0015602 A1 | 1/2004 | Goldhammer et al. |
| 2005/0286416 A1 | 12/2005 | Shimonishi et al. |
| 2006/0221974 A1* | 10/2006 | Hilla et al. ................. 370/394 |

FOREIGN PATENT DOCUMENTS

| | | |
|---|---|---|
| EP | 1178635 A | 2/2002 |

OTHER PUBLICATIONS

Iida, et al.; Delay Analysis for CBR Traffic Under Static-Priority Scheduling; IEEE/ACM Transactions on Networking, vol. 9, No. 2; Apr. 2001; pp. 177-185.

Korhonen et al.; Effect of Packet Size on Loss Rate and Delay in Wireless Links; IEEE Comunications Society /WCNC 2005; pp. 1608-1613.

* cited by examiner

METHOD AND SYSTEM FOR DYNAMICALLY ADJUSTING PACKET SIZE TO DECREASE DELAYS OF STREAMING DATA TRANSMISSIONS ON NOISY TRANSMISSION LINES

FIELD OF THE INVENTION

The present invention relates to method and system for dynamically adjusting packet size to decrease delays of a streaming data transmission.

BACKGROUND OF THE INVENTION

In conventional Transmission Control Protocol/Internet Protocol (TCP/IP)-based communication of continuous data streams (e.g., video streams) where the data receiver is separated from the data transmitter by one or more link segments on which data can be damaged (i.e., distorted), the overall communication line throughput suffers due to the fact that the longer a TCP packet is, the more likely the data is distorted. In certain data receivers such as cell phones receiving video streams, when a TCP packet for a continuous data stream is distorted (i.e., any number of bits are missing or the bits indicate an incorrect value), the entire TCP packet is dropped and a retransmission is requested. That retransmission, in turn, is also not guaranteed to be free of distortion, so subsequent retransmissions may be needed. The need for retransmissions and subsequent retransmissions lead to unacceptable data delivery delays (e.g., a delay in the outputting of a video data stream onto a display on the data receiver). In cell phone data communication, the quality of the wireless link is inferior and varies over time, leading to a substantial image delay in a video stream (e.g., a delay of several dozen seconds). A shorter TCP packet decreases the likelihood of data distortion, but increases overhead costs of network bandwidth. The overhead costs increase because shortening the packet length shortens the data portion of the packet, but does not shorten the length of a packet's header. A typical TCP packet length is about 1500 bytes with about 50 bytes being allocated to the header. In this typical case, the overhead is insignificant, but the chance of the packet being damaged is very high if the communication line is noisy. Thus, there exists a need to overcome at least one of the preceding deficiencies and limitations of the related art.

SUMMARY OF THE INVENTION

The present invention provides a computer-based method of dynamically adjusting packet size to decrease a delay of a streaming data transmission, the method comprising:

obtaining a first measurement by a measuring computing unit, wherein the first measurement is selected from the group consisting of a delay of a streaming data transmission being sent from a data transmission server to a client computing unit via a plurality of packets and a frequency of damaged packets of the plurality of packets, the damaged packets contributing to the delay of the streaming data transmission, and wherein the measuring computing unit is the data transmission server or the client computing unit; and adjusting a packet size by the data transmission server, the packet size being a size associated with each packet of the plurality of packets, the adjusting the packet size including utilizing the first measurement and facilitating a reduction of the delay, wherein the delay results from noise on one or more communication link segments over which the streaming data transmission is sent from the data transmission server to the client computing unit.

A computing system, computer program product, and process for supporting computing infrastructure corresponding to the above-summarized method are also described and claimed herein.

Advantageously, the present invention provides a technique for dynamically adjusting packet size to decrease a delay of a streaming data transmission on a noisy transmission line.

DETAILED DESCRIPTION OF THE INVENTION

Figure 1:
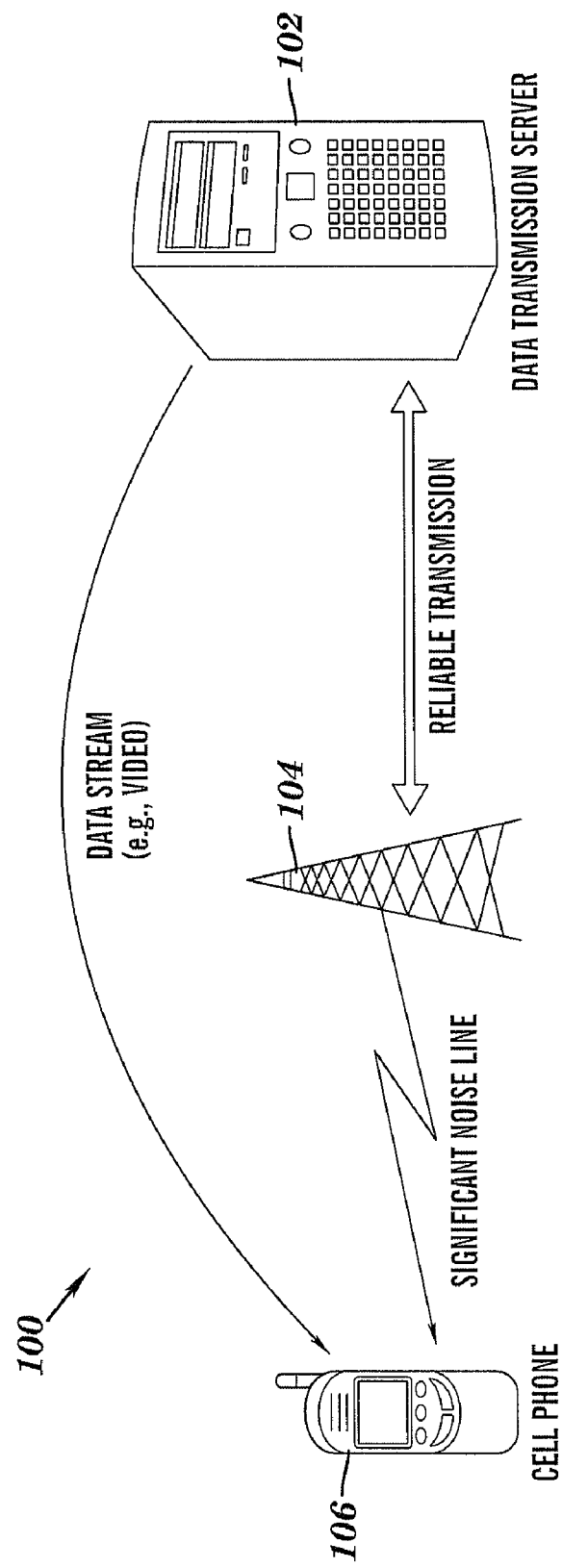
FIG. 1 is a system for transmitting streaming data, in accordance with embodiments of the present invention.

The present invention provides techniques for dynamically adjusting packet size to decrease streaming data transmission delays caused by noisy transmission lines. In one embodiment, a small, selected portion of the data stream is sent in a transmission separate from the primary data stream. The selected portion's position in the original data stream is identified and timestamps associated with the selected portion are used to measure a streaming data transmission delay. The separate transmission of the selected portion either uses the primary TCP connection between a data transmission server and a client computing unit, or an extra pacing connection. The measured delay is compared to a target value to determine if the packet size needs to be adjusted. In another embodiment, the delay is computed using timestamp information in the data transmission server's TCP stack that is made accessible to an application residing on the data transmission server. In yet another embodiment, the adjustment of the packet size uses a communication line quality table that associates optimal packet sizes with frequencies of damaged packets received by the client computing unit.

Techniques for Measuring Delay

The present invention uses any of the following techniques for measuring streaming data transmission delay (a.k.a. measured delay, delay measurement, transmission delay, actual delay or delay):

Technique 1: Two connections (e.g., TCP connections) are established between a data transmission server (a.k.a. data stream source, data transmitter, sender and server) and a client computing unit (a.k.a. data receiver, client, and receiver) (e.g., cell phone). One of the connections is a primary connection used by the actual data of the streaming data transmission. The other connection is an extra connection (i.e., pacing connection) used for pacing and measuring the streaming data. The data transmission server uses the pacing connection to deliver a small number of bytes (a.k.a. the selected portion) selected from a larger chunk of data (e.g., a video frame). The larger chunk of data is sent to the client computing unit via the primary connection. Since the selected portion of data sent in the pacing connection is small relative to the larger chunk of data, the selected portion's transmission via the pacing connection requires relatively short packets. Because of the relative shortness of the packets delivering the small number of bytes, the pacing connection does not suffer significant data distortion and the client computing unit is able to use the data sent via the pacing connection to measure the streaming data transmission delay. If the delay becomes unacceptable, the client computing unit signals to the data transmission server to request the server to send packets of a shorter size. Technique 1 is described in more detail in the discussion relative to FIG. 4A, which is presented below.

Technique 2: The small number of bytes is selected from the larger chunk of data and used for measuring the streaming data transmission delay as in technique 1, but there is no extra pacing connection. Instead, the selected portion is sent over the primary connection (i.e., the same connection used by the data stream) from the client computing unit to the data transmission server. Technique 2 is used primarily for cases in which the primary data stream is asymmetric. That is, a substantial portion of the transmitted data is sent from the server to the client (e.g., a unidirectional video stream). Technique 2 is also described below relative to FIG. 4A.

Technique 3: The third technique again uses portions of the data stream selected as described above relative to Techniques 1 and 2. Technique 3 measures the streaming data transmission delay using timestamp information in the data transmission server's TCP stack that is made accessible to an application residing on the data transmission server. The data transmission server keeps track of TCP ACK numbers it receives from the client, along with timestamps that indicate when the selected portions are sent. By comparing the time when the TCP ACK packet is received with the timestamp of the actual data send operation of a selected portion, the streaming data transmission delay is computed. That is, the delay is computed using the difference between the timestamp of the data send operation of the selected portion and the timestamp of the receipt of the TCP ACK packet.

Problem Formulation and System Overview

FIG. 1 is a system for transmitting streaming data (e.g., video). As used herein, streaming data is defined as a one-way transmission of media (e.g., audio or video) that is consumed (e.g., listened to or watched) while it is being delivered via a computer network. System 100 includes a data transmission server 102, a transmission tower 104 and a cell phone 106. Data transmission server 102 is the source of streaming data. Cell phone 106 has the capability of outputting the streaming data (e.g., displaying streaming video). The transmission of streaming data is reliable between data transmission server 102 and transmission tower 104. Significant noise occurs in the communication line (a.k.a. link segment) between transmission tower 104 and cell phone 106, thereby damaging (a.k.a. distorting or corrupting) one or more packets included in the streaming data.

Figure 2:
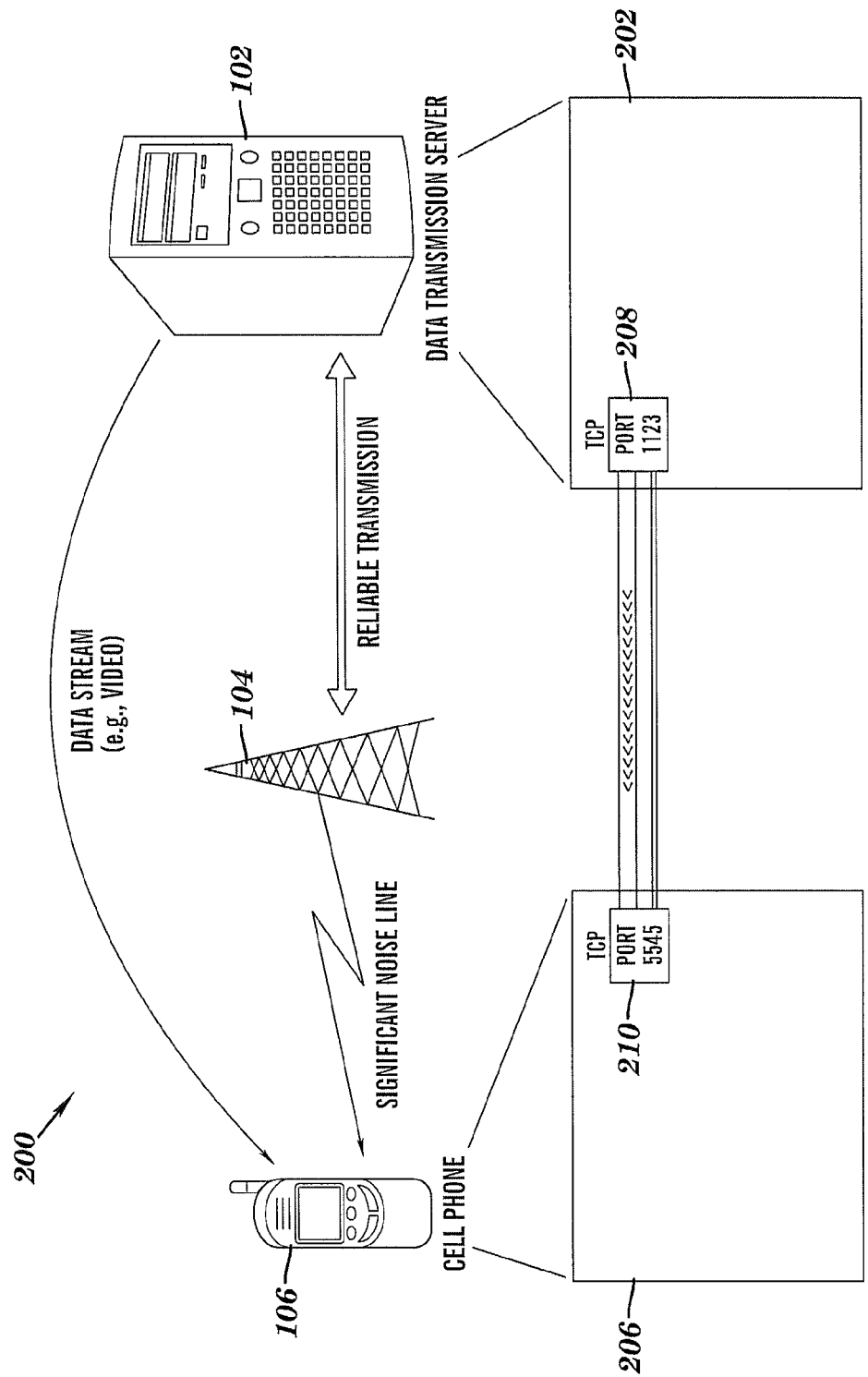
FIG. 2 depicts an asymmetric transmission via a TCP connection in the system of FIG. 1, in accordance with embodiments of the present invention.

FIG. 2 depicts an asymmetric data transmission via a TCP connection in the system of FIG. 1. System 200 includes data transmission server 102, transmission tower 104 and cell phone 106, as described above relative to FIG. 1. View 202 is an exploded view of data transmission server 102 and view 206 is an exploded view of cell phone 106. View 202 includes a TCP port 208 of data transmission server 102 and view 206 includes a TCP port 210 of cell phone 106. TCP ports 208 and 210 establish a TCP connection, which allows an asymmetric transmission of the streaming data from data transmission server 102 to cell phone 106 (i.e., represented by the top band of the two bands connecting port 208 and port 210). The TCP connection also allows cell phone 106 to confirm receipt of packets in the streaming data via the bottom band of the two bands connecting port 208 and port 210.

In one embodiment, a measurement of the delay in the streaming data transmitted from data transmission server 102 and cell phone 106 is performed using the TCP connection established by ports 208 and 210 without requiring an extra, pacing connection.

Figure 3:
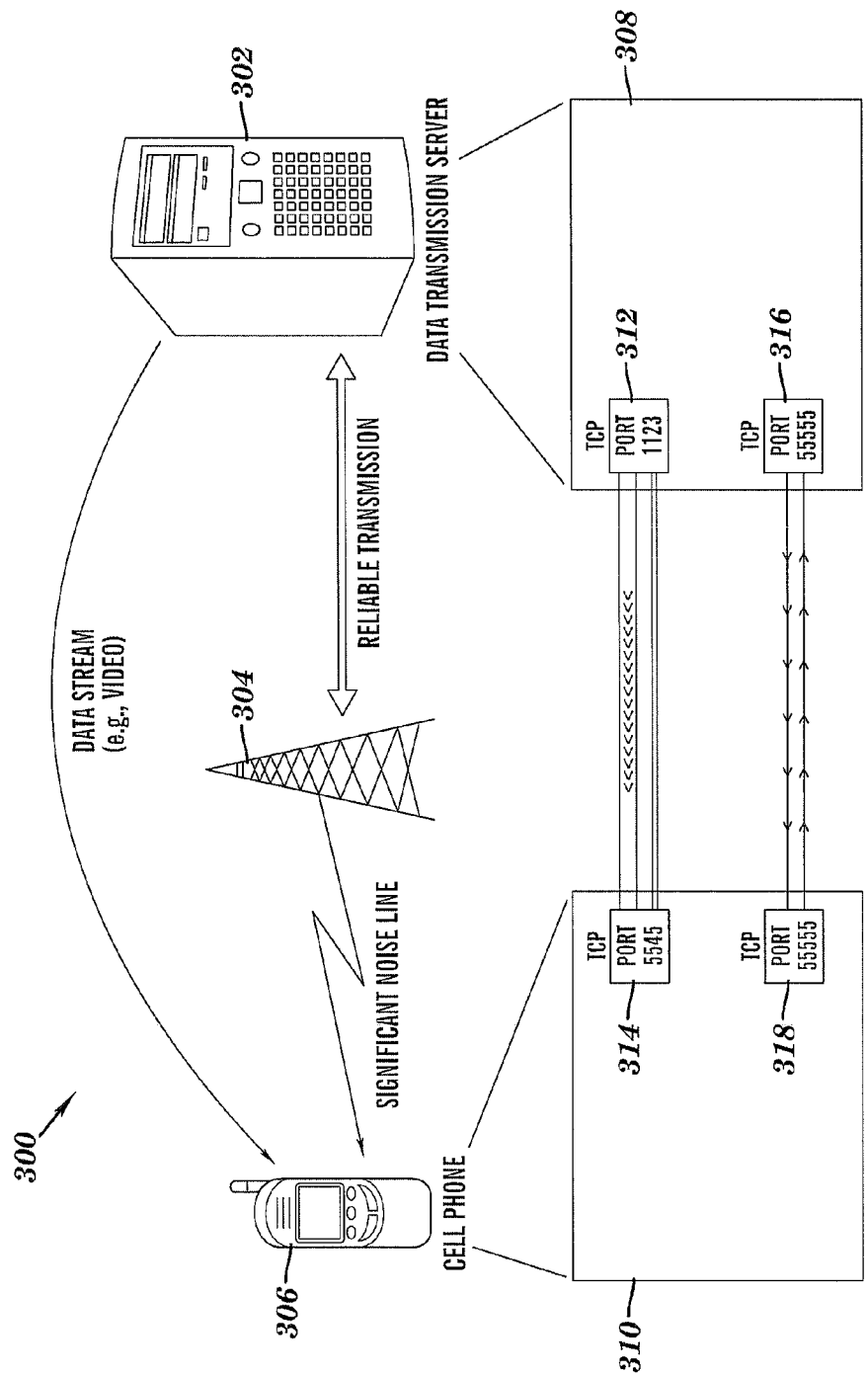
FIG. 3 depicts a primary TCP connection and a pacing TCP connection in the system of FIG. 1 for dynamically adjusting packet size to decrease a delay in a streaming data transmission, in accordance with embodiments of the present invention.

FIG. 3 depicts a primary TCP connection and a pacing TCP connection in a system for dynamically adjusting packet size to decrease a delay in a streaming data transmission, in accordance with embodiments of the present invention. System 300 includes a data transmission server 302, a transmission tower 304 and a cell phone 306. Data transmission server 302 is the source of streaming data (a.k.a. data stream or primary data stream) sent by the data transmission server to cell phone 306. Cell phone 306 is a cell phone (e.g., smart phone) that has the capability of outputting streaming data (e.g., displaying streaming video). Cell phone 306 is an example of a client computing unit that receives and outputs the streaming data from data transmission server 302. The present invention contemplates replacing cell phone 306 in system 300 with any other client computing unit having the capability of outputting streaming data.

Similar to FIG. 1, the transmission of streaming data is reliable between data transmission server 302 and transmission tower 304. Significant noise in the communication line between transmission tower 304 and cell phone 306 damages one or more packets included in the streaming data (e.g., one or more packets are missing bits and/or have incorrect bits).

View 308 is an exploded view of data transmission server 302 and view 310 is an exploded view of cell phone 306. View 308 includes a TCP port 312 and view 310 includes TCP port 314. Ports 312 and 314 are used to establish a primary TCP connection between data transmission server 302 and cell phone 306. The primary TCP connection is used to transmit the actual media data in the streaming data. For example, the primary connection is used to transmit asymmetric streaming data from data transmission server 302 to cell phone 306 (see top band between ports 312 and 314) and allows cell phone 306 to send packet receipt confirmations to data transmission server 302 (see bottom band between ports 312 and 314).

View 308 includes a port 316 and view 310 includes a port 318. Ports 316 and 318 are used to establish a pacing connection between data transmission server 302 and cell phone 306. In one embodiment, the pacing connection is used for measuring a delay in the delivery of the streaming data to cell phone 306 from data transmission server 302.

Decreasing Packet Size

Figure 4A:
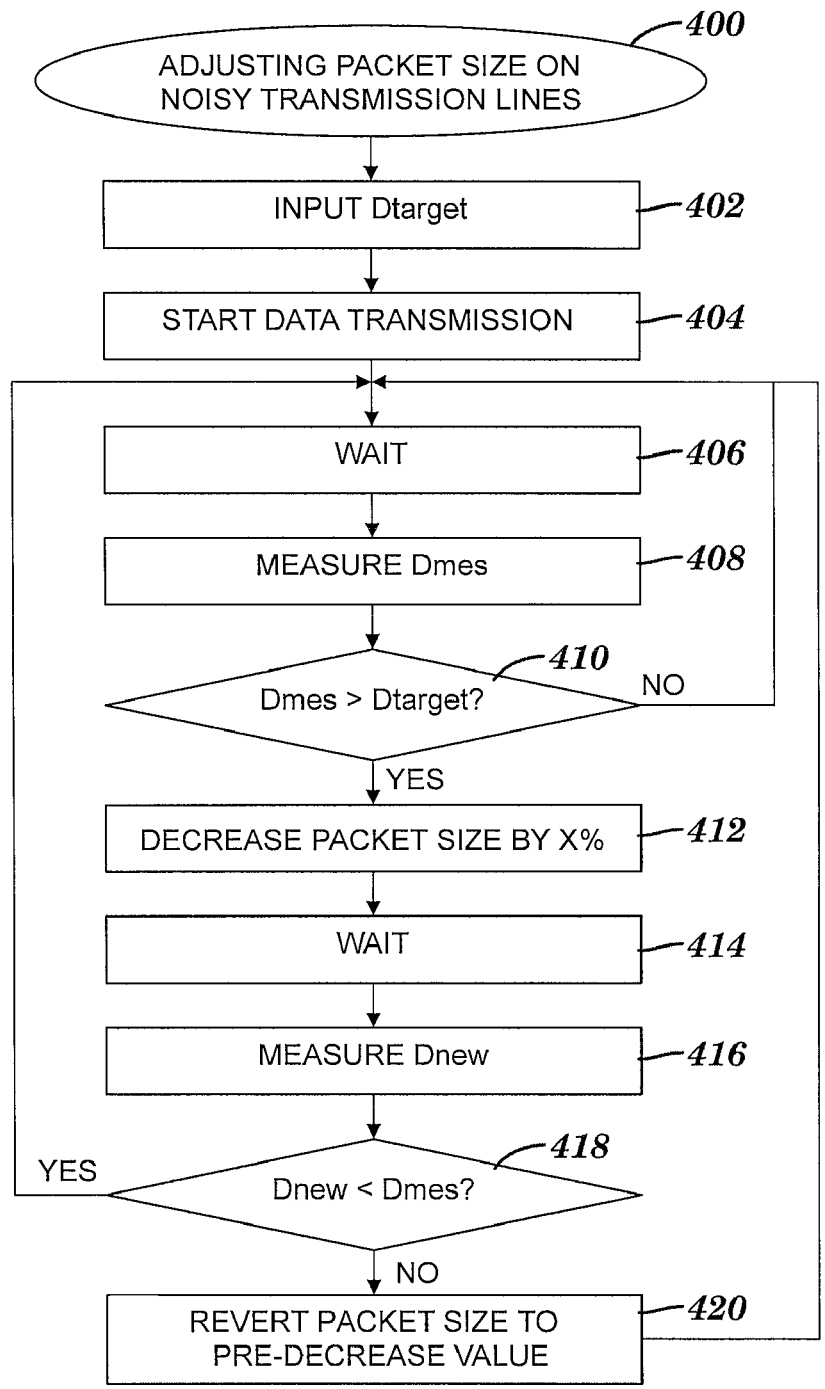
FIG. 4A is a flow diagram of a process of dynamically adjusting packet size to decrease delay in a streaming data transmission, in accordance with embodiments of the present invention.

FIG. 4A is a flow diagram of a process of dynamically adjusting packet size to decrease delay in a streaming data transmission, in accordance with embodiments of the present invention. The process of FIG. 4A begins at step 400. In step 402, a target value (a.k.a. Dtarget) for the streaming data transmission delay is input into data transmission server 302 (see FIG. 3). The target value is set as a tolerable streaming data delay by, for instance, a user or a system administrator. The target value is based on, for example, the user or system administrator's (1) experience with tolerable streaming data delays or (2) desired data transmission quality.

In step 404, data transmission server 302 (see FIG. 3) initiates a streaming data transmission with a predetermined packet size for the streaming data. The streaming data is sent from data transmission server 302 (see FIG. 3) to cell phone 306 (see FIG. 3) via the primary connection between ports 312 and 314 (see FIG. 3). In one embodiment, the streaming data transmission starts with the maximum packet size allowed for the communication link being used by the streaming data.

In step 406, the process of FIG. 4A waits for a predefined duration of time (e.g., one second) so that step 408 is initiated at expirations of predefined time intervals via the loops that are described below. Step 408 selects a relatively short portion (e.g., 30-40 bytes) (hereinafter referred to as the selected portion) of the data stream initiated in step 404 and sends the selected portion over the pacing connection established by ports 316 and 318 (see FIG. 3). The length of the selected portion is determined so that the selected portion is unique or substantially unique within the data stream. In one embodiment, a selected portion length of 30 to 40 bytes is sufficient to ensure substantial uniqueness within the data stream. In a first embodiment, cell phone 306 (see FIG. 3) chooses and sends the selected portion in step 408 to data transmission server 302 (see FIG. 3) after the cell phone receives, via the primary connection, the part of the data stream that includes the selected portion. In a second embodiment, data transmission server 302 (see FIG. 3) chooses and sends the selected portion in step 408 to cell phone 306 (see FIG. 3) over a pacing connection.

Further, step 408 identifies the position of the selected portion in the primary connection's data stream and uses an intermediate result to facilitate a computation of the delay in the streaming data transmission. The intermediate result is either: (1) the difference between a first timestamp of a sender sending the selected portion within the transmission of the data stream and a second timestamp of the sender receiving a confirmation from a receiver of the data stream, or (2) the difference between a first timestamp of a receiver receiving the selected portion without the rest of the data stream via a separate pacing connection and a second timestamp of the receiver receiving the selected portion within the transmission of the data stream via the primary connection. The difference described in (1) is T1+T2 and the difference described in (2) is T1−T2, where T1 is the actual delay of the streaming data transmission (i.e., the time interval between a sender's sending of packets included in a streaming data transmission over a primary connection and a receiver's assembly of data from the packets) and T2 is the time interval required to deliver the selected portion of the streaming data transmission without the rest of the data stream over a pacing connection or the primary connection.

Step 408 then computes the streaming data transmission delay T1 by subtracting a measurement of T2 from the intermediate result in the case of (1) listed above, or by adding a measurement of T2 to the intermediate result in the case of (2) listed above. The delay computed by step 408 is also referred to as the measured delay or Dmes. Step 408 measures T2 by using a known technique, such as calculating a round-trip communication time (a.k.a. round-trip time) between data transmission server 302 (see FIG. 3) and cell phone 306 (see FIG. 3) and dividing the round-trip communication time by 2. The round-trip time is determined, for instance, by pinging the receiver or the sender (e.g., with an Internet Control Message Protocol ping utility).

In the first embodiment described above relative to step 408, data transmission server 302 (see FIG. 3) separates the data stream transmission into TCP packets and sends them to cell phone 306 (see FIG. 3). In response to server 302 (see FIG. 3) sending a packet of the data stream transmission, a timestamp is added to a timestamp table. An entry in the timestamp table identifies a portion of data in the data stream and the time that the portion of data was sent (e.g., an entry in the form <Bytes from X to Y><sent at hh:mm:ss:ms>). Cell phone 306 (see FIG. 3) confirms the reception of the selected portion by sending a message (a.k.a. confirmation message) to data transmission server 302 (see FIG. 3) that reports the bytes that make up the selected portion. Data transmission server 302 (see FIG. 3) examines the data stream and identifies the location of the selected portion within the data stream. In the timestamp table, data transmission server 302 (see FIG. 3) looks up the timestamp associated with the identified location. Server 302 (see FIG. 3) computes the intermediate result in step 408 as the difference between the timestamp of the receipt of the confirmation message and the timestamp found in the timestamp table. The difference computed as the intermediate result in step 408 is T1+T2, as described above (i.e., the actual delay plus the time taken to transmit the confirmation message). Server 302 (see FIG. 3) subtracts (round-trip time)/2 from the T1+T2 measurement to determine Dmes (i.e., the actual delay time T1).

In the second embodiment described above relative to step 408, cell phone 306 (see FIG. 3) receives the data stream transmission, assembling the transmission from incoming TCP packets over a primary connection. Data transmission server 302 (see FIG. 3) sends the selected portion of the data stream transmission out of band in a separate pacing connection (e.g., by a TCP connection separate from the primary connection). Cell phone 306 (see FIG. 3) receives the selected portion in the out of band data and determines a first timestamp indicating the receipt time of the selected portion in the out of band data. As cell phone 306 (see FIG. 3) continues to receive the data stream transmission via the primary connection, the cell phone attempts to match the selected portion with a portion of the incoming data stream. When cell phone 306 (see FIG. 3) finds a match for the selected portion, the cell phone determines a second timestamp of the time that the match was found. Cell phone 306 (see FIG. 3) computes the intermediate result in step 408 as the difference between the second timestamp and the first timestamp. The difference computed as the intermediate result in step 408 is T1−T2, as described above. To determine Dmes (i.e., the actual delay time T1), cell phone 306 (see FIG. 3) adds (round-trip time)/2 to the T1−T2 measurement.

Following step 408, inquiry step 410 determines if Dmes is greater than Dtarget (i.e., the measured delay is too long). If step 410 determines that the measured delay is not too long (i.e., Dmes<=Dtarget), then the process of FIG. 4A loops back to the waiting procedure of step 406. This loop provides that the initiation of the procedure of computing the measured delay in step 408 is performed at the expirations of predefined time intervals (e.g., once every second).

If step 410 determines that the measured delay is too long (i.e., Dmes>Dtarget), then step 412 decreases the packet size used by the data stream by a specified amount (e.g., 10%). Step 412 is performed by data transmission server 302 (see FIG. 1). If cell phone 306 (see FIG. 3) computes Dmes in step 408, then data transmission server 302 (see FIG. 3) performs step 412 in response to a request from the cell phone to decrease the packet size.

In one embodiment, the specified amount in step 412 is a predefined percentage. In another embodiment, the specified amount in step 412 is based on the amount that Dmes is greater than Dtarget. For example, the greater the difference between Dmes and Dtarget, the higher the percentage used as the specified amount.

After decreasing the packet size, another waiting period of a predefined duration occurs in step 414. The duration of the waiting period of step 414 can be the same or different from the duration of the waiting period of step 406. In step 416, a new delay measurement (a.k.a. Dnew) is computed. Step 416 follows the above-described method of step 408, except the computation of the delay provides Dnew instead of Dmes. The component (i.e., data transmission server or cell phone) that measures the delay in step 408 also measures the delay in step 416.

Inquiry step 418 determines whether Dnew is less than Dmes (i.e., whether an improvement in the delay is detected). If Dnew is less than Dmes, then the process of FIG. 4A loops back to step 406. In this current iteration that follows the loop back to step 406, the waiting period in step 406 expires and another Dmes measurement is computed in step 408. If step 410 determines that the most recent Dmes (i.e., Dmes computed in the current iteration) exceeds the target value of step 402, then an additional reduction of the packet size occurs at step 412. In one embodiment, the additional reduction uses the same specified amount used in the prior performance of step 412 (i.e., the original specified amount). In another embodiment (not shown), each additional reduction of the packet size in step 412 uses a specified amount that is the same as or different from the original specified amount used by the initial performance of step 412.

Returning to step 418, if Dnew is greater than or equal to Dmes (i.e., no improvement in the delay is detected), then in step 420 data transmission server 302 (see FIG. 3) reverts the packet size of the data stream to the pre-decrease value (i.e., the packet size that was changed by the reduction in the most recent execution of step 412). If cell phone 306 (see FIG. 3) computes Dnew in step 416, then data transmission server 302 (see FIG. 3) performs step 420 in response to a request from the cell phone to decrease the packet size.

The process of FIG. 4A provides a method of tuning the packet size lower after the initial startup of the streaming data transmission, as well as in response to an increase in noise on the communication line used by the streaming data.

In an embodiment that employs Technique 2 (i.e., there is no pacing connection and the selected portion is sent over the same connection used by the primary data stream), the above-described process of FIG. 4A is modified so that the steps that mention the data transmission server and cell phone refer to data transmission server 102 (see FIG. 2) and cell phone 106 (see FIG. 2), and the delay measurement steps 408 and 418 are initiated by the cell phone sending the selected portion of data from the data stream back to the server over the same TCP connection that is used for the primary data stream (i.e., the TCP connection established by ports 208 and 210 in FIG. 2).

In an embodiment that employs Technique 3, the above-described process of FIG. 4A is modified so that the delay measurement steps 408 and 418 include the calculation of the difference between a two timestamps tracked by the data transmission server: (1) a timestamp of a receipt of a TCP ACK packet that acknowledges receipt of the selected portion sent via the pacing connection and (2) a timestamp indicating when the selected portion is sent by the data transmission server to the client computing unit.

Increasing Packet Size

Figure 4B:
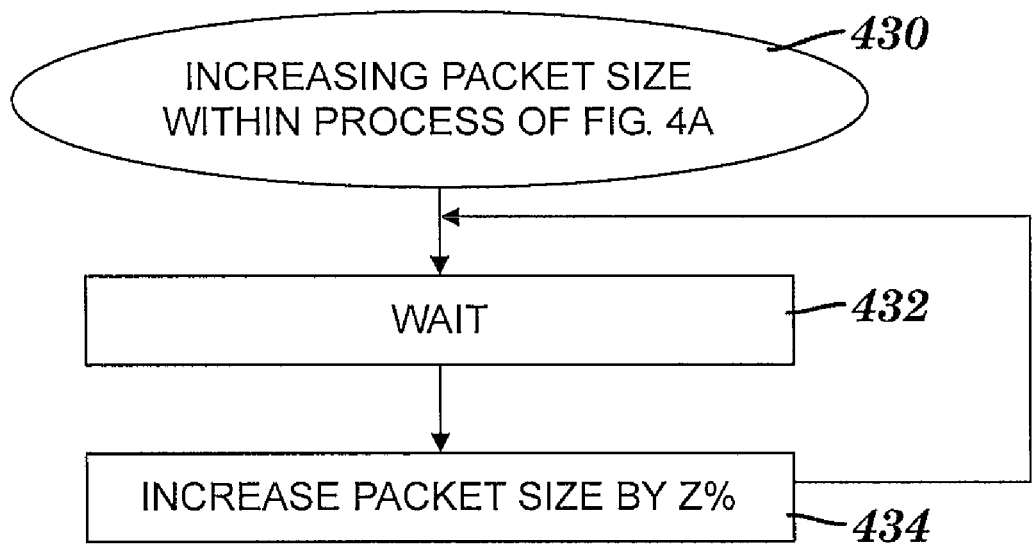
FIG. 4B is a flow diagram of a process of dynamically increasing packet size within the process of FIG. 4A, in accordance with embodiments of the present invention.

FIG. 4B is a flow diagram of a process of dynamically increasing packet size within the process of FIG. 4A, in accordance with embodiments of the present invention. The process of FIG. 4B begins at step 430, which follows a decrease of the packet size in step 412 of FIG. 4A. After a predefined waiting period in step 432, data transmission server 302 (see FIG. 3) increases the packet size used by the data stream in step 434. The packet size increase in step 434 is of a predefined increase amount (e.g., 5%), which is not necessarily the same percentage as the predefined decrease amount used in step 412 of FIG. 4A. Following step 434, the process of FIG. 4B loops back to step 432, thereby performing the packet size increase of step 434 at the expiration of predefined time intervals (e.g., every 30-180 seconds). In one embodiment, the waiting period in step 432 is longer than the waiting period of steps 406 and 414 of FIG. 4A (e.g., increasing the packet size every 30 seconds vs. using a wait period of 1 second in steps 406 and 414 of FIG. 4A). If the wait period of step 432 exceeds the wait periods of FIG. 4A, then there may be one or more decreases in packet size (i.e., due to the step 412 of FIG. 4A) in between each packet size increase provided by one of the multiple executions of step 434.

The packet size increase process of FIG. 4B allows a gradual increase in packet size of the data stream in response to an improvement in the communication line quality (e.g., the user's cell phone moves closer to communications tower 304 (see FIG. 3) or exits an area where static is high). If the process of FIG. 4A does not detect an excessive delay in the streaming data transmission, the larger packet size provided by step 434 is retained and overhead associated with network bandwidth usage is improved. If the process of FIG. 4A detects a measured delay in the streaming data transmission that exceeds the target value (i.e., the transmission delay is not at a tolerable level), then the packet size is decreased again by step 412 of FIG. 4A.

Communication Line Quality

Figure 5:
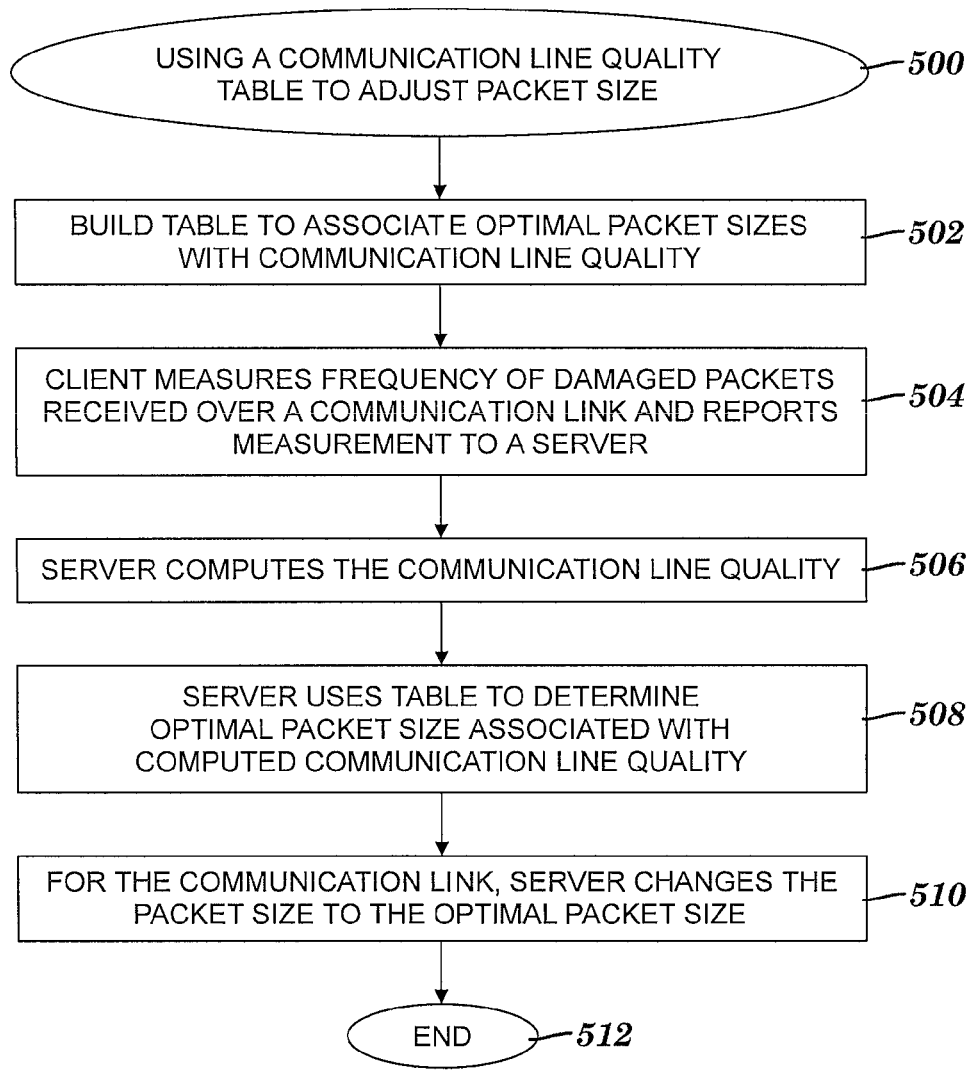
FIG. 5 is a flow diagram of a process of using a communication line quality table as an alternate to the process of FIG. 4A, in accordance with embodiments of the present invention.

FIG. 5 is a flow diagram of a process of using a communication line quality table as an alternate to the process of FIG. 4A, in accordance with embodiments of the present invention. The process of FIG. 5 begins at step 500 and uses a computer-based modeling of the process of packet transmission and packet damage. In step 502, the modeling scheme results in the building of a communication line quality table that associates optimal packet sizes with communication line quality values. A communication line quality value is a frequency of signal interference (i.e., the probability that a signal interference problem happens within a certain time period). The communication line quality table values take into consideration the length of the packet header. In step 504, cell phone 306 (see FIG. 3) continuously measures the frequency (e.g., percentage or incidence) of damaged packets (a.k.a. package damage rate) received from data transmission server 302 (see FIG. 3) and reports the measurements to the data transmission server. In step 506, data transmission server 302 (see FIG. 3) computes the communication line quality according to the formula:

Communication Line Quality=Packet Length/Packet Damage Rate

In step 508, data transmission server 302 (see FIG. 3) uses the communication line quality table built in step 502 to determine the optimal packet size associated with the computed communication line quality. In step 510, data transmission server 302 (see FIG. 3) changes the packet size for the communication link to the optimal packet size determined in step 508. The process of FIG. 5 ends at step 512.

Computing System

Figure 6:
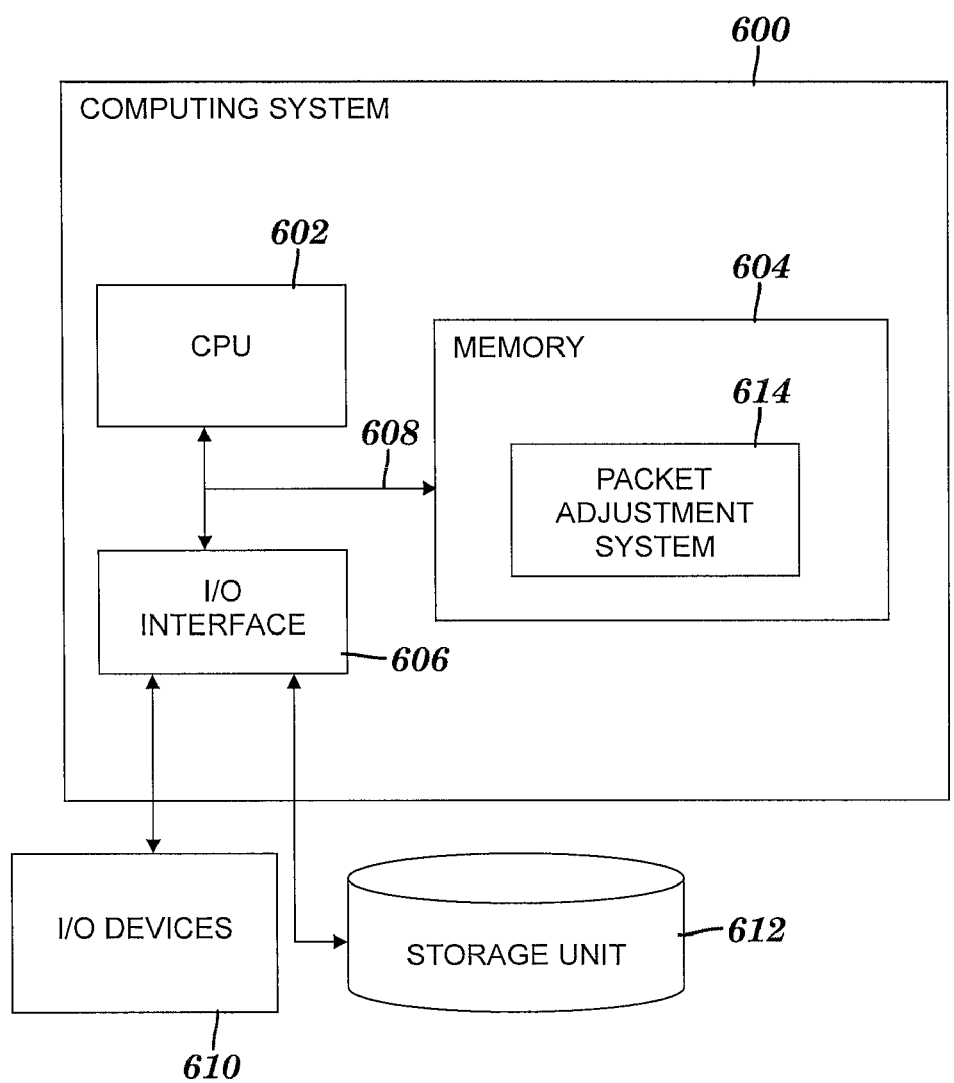
FIG. 6 is a block diagram of a computing system that implements the processes of FIGS. 4A, 4B and 5, in accordance with embodiments of the present invention.

FIG. 6 is a block diagram of a computing system included in the system of FIG. 2 or FIG. 3 and that implements the processes of FIGS. 4A, 4B, 4C and 5, in accordance with embodiments of the present invention. Computing system 600 generally comprises a central processing unit (CPU) 602, a memory 604, an input/output (I/O) interface 606, a bus 608, I/O devices 610 and a storage unit 612. CPU 602 performs computation and control functions of computing unit 600. CPU 602 may comprise a single processing unit, or be distributed across one or more processing units in one or more locations (e.g., on a client and server).

Memory 604 may comprise any known type of data storage and/or transmission media, including bulk storage, magnetic media, optical media, random access memory (RAM), read-only memory (ROM), a data cache, a data object, etc. Cache memory elements of memory 604 provide temporary storage of at least some program code in order to reduce the number of times code must be retrieved from bulk storage during execution. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

I/O interface 606 comprises any system for exchanging information to or from an external source. I/O devices 610 comprise any known type of external device, including a display monitor, keyboard, mouse, printer, speakers, hand-held device, printer, facsimile, etc. Bus 608 provides a communication link between each of the components in computing system 600, and may comprise any type of transmission link, including electrical, optical, wireless, etc.

I/O interface 606 also allows computing system 600 to store and retrieve information (e.g., program instructions or data) from an auxiliary storage device 612. The auxiliary storage device may be a non-volatile storage device such as a magnetic disk drive or an optical disk drive (e.g., a CD-ROM drive which receives a CD-ROM disk). Computing system 600 can store and retrieve information from other auxiliary storage devices (not shown), which can include a direct access storage device (DASD) (e.g., hard disk or floppy diskette), a magneto-optical disk drive, a tape drive, or a wireless communication device.

Memory 604 includes a system 614 (i.e., packet adjustment system) for dynamically adjusting packet size to decrease a delay of a streaming data transmission. Packet adjustment system 614 implements steps executed by a data transmission server 102 (see FIG. 2) or 302 (see FIG. 3) or by a client computing unit (e.g., cell phone) 106 (see FIG. 2) or 306 (see FIG. 3) in one or more of the processes of FIGS. 4A-4C and 5. Further, memory 604 may include other systems not shown in FIG. 6, such as an operating system (e.g., Linux) that runs on CPU 602 and provides control of various components within and/or connected to computing system 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of a system 614 for dynamically adjusting packet size to decrease a delay of a streaming data transmission for use by or in connection with a computing system 600 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 604, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the dynamic packet adjustment process of the present invention. Thus, the present invention discloses a process for supporting computer infrastructure, comprising integrating, hosting, maintaining and deploying computer-readable code into a computing system (e.g., computing system 600), wherein the code in combination with the computing system is capable of performing a method of dynamically adjusting packet size to decrease a delay of a streaming data transmission.

In another embodiment, the invention provides a business method that performs the process steps of the invention on a subscription, advertising and/or fee basis. That is, a service provider, such as a Solution Integrator, can offer to create, maintain, support, etc. a process of dynamically adjusting packet size to decrease a delay of a streaming data transmission of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-based method of dynamically adjusting packet size to decrease a delay of a streaming data transmission, said method comprising:

obtaining a first measurement by a measuring computing unit, wherein said first measurement is a delay of a streaming data transmission being sent from a data transmission server to a client computing unit via a plurality of packets and a frequency of damaged packets of said plurality of packets, said damaged packets contributing to said delay of said streaming data transmission, and wherein said measuring computing unit is said data transmission server or said client computing unit;

adjusting a packet size by said data transmission server, said packet size being a size associated with each packet of said plurality of packets, said adjusting said packet size including utilizing said first measurement and facilitating a reduction of said delay, wherein said delay results from noise on one or more communication link segments over which said streaming data transmission is sent from said data transmission server to said client computing unit, and wherein said first measurement is said delay of said streaming data transmission;

obtaining a target value of said delay that indicates a tolerable delay that does not require an adjustment of any packet included in said streaming data transmission;

obtaining a first set of one or more measurements of said delay, said first set of one or more measurements obtained in response to one or more expirations of one or more predefined time intervals of a first plurality of predefined time intervals, and said first set of one or more measurements including said first measurement;

determining that said first measurement is greater than said target value;

decreasing, by said data transmission server, said packet size by a first predefined amount, said decreasing said packet size including changing said packet size from a pre-decrease size to a decreased size, and said decreasing said packet size performed in response to said determining that said first measurement is greater than said target value;

obtaining a new measurement of said delay, said obtaining said new measurement subsequent to said decreasing said packet size and subsequent to a predefined waiting period;

determining a characteristic of said new measurement, wherein said characteristic of said new measurement is selected from the group consisting of said new measurement is less than said target value, said new measurement is less than said first measurement but not less than said target value, and said new measurement is greater than or equal to said first measurement;

obtaining a second set of one or more measurements of said delay if said characteristic is said new measurement is less than said target value, said obtaining said second set of one or more measurements of said delay performed by said measuring computing unit, and said second set of one or more measurements obtained in response to one or more expirations of one or more predefined time intervals of a second plurality of predefined time intervals;

decreasing said packet size by an additional amount if said characteristic is said new measurement is less than said first measurement but not less than said target value, said decreasing said packet size by said additional amount performed by said data transmission server; and restoring said packet size to said pre-decrease size if said characteristic is said new measurement is greater than or equal to said first measurement, said restoring performed by said data transmission server.

2. The method of claim 1, wherein said measuring computing unit is said data transmission server, and wherein said method further comprises:

sending, by said data transmission server and to said client computing unit over a primary connection, data of said streaming data transmission, said data of said streaming data transmission including a selected portion of said data of said streaming data transmission, and said primary connection being a Transmission Control Protocol (TCP) connection between said data transmission server and said client computing unit;

receiving, by said data transmission server and from said client computing unit, said selected portion via a pacing connection, said selected portion being received without substantial damage caused by said noise, said selected portion being substantially unique within said data of said streaming data transmission, and said pacing connection being a TCP connection or a User Datagram Protocol (UDP) connection;

identifying, by said data transmission server, an original position of said selected portion in said data of said streaming data transmission; and computing, by said data transmission server, said delay, said computing including utilizing said original position.

3. The method of claim 1, wherein said measuring computing unit is said data transmission server, and wherein said method further comprises:

sending, by said data transmission server and to said client computing unit over a connection, data of said streaming data transmission, said data of said streaming data transmission including a selected portion of said data of said streaming data transmission, said connection being a TCP connection between said data transmission server and said client computing unit;

receiving, by said data transmission server and from said client computing unit, said selected portion of said data of said streaming data transmission via said connection, said selected portion being received without substantial damage caused by said noise, and said selected portion being substantially unique within said data of said streaming data transmission;

identifying, by said data transmission server, an original position of said selected portion in said data of said streaming data transmission; and computing, by said data transmission server, said delay, said computing including utilizing said original position.

4. The method of claim 1, wherein said measuring computing unit is said data transmission server, and wherein said method further comprises:

receiving, by an application of said data transmission server and from a TCP stack, a first timestamp of a transmission of a portion of said streaming data transmission from said data transmission server to said client computing unit;

receiving, by said application of said data transmission server and from said TCP stack, a second timestamp of an acknowledgment packet indicating an acknowledgment of a receipt by said client computing unit of said portion; and computing said delay, said computing including calculating, by said data transmission server, a difference between said first timestamp and said second timestamp.

5. The method of claim 1, wherein said measuring computing unit is said client computing unit, and wherein said method further comprises:

receiving, by said client computing unit and from said data transmission server over a primary connection, data of said streaming data transmission, said data of said streaming data transmission including a selected portion of said data of said streaming data transmission, and said primary connection being a TCP connection between said data transmission server and said client computing unit;

receiving, by said client computing unit and from said data transmission server, said selected portion via a pacing connection, said selected portion being substantially unique within said data of said streaming data transmission, and said pacing connection being a TCP connection or a UDP connection between said data transmission server and said client computing unit;

identifying, by said client computing unit, an original position of said selected portion in said data of said streaming data transmission; and computing, by said client computing unit, said delay, said computing including utilizing said original position.

6. The method of claim 1, further comprising:

increasing, by said data transmission server in response to one or more expirations of one or more predefined time intervals of a third plurality of predefined time intervals, said packet size by a second predefined amount, said increasing said packet size including changing said packet size from a pre-increase size to an increased size;

obtaining, by said data transmission server and subsequent to said increasing, a post-increase measurement of said delay;

determining, by said data transmission server, that said post-increase measurement is less than a pre-increase measurement associated with said pre-increase size, said pre-increase measurement being said first measurement or said new measurement; and maintaining said packet size at said increased size in response to said determining that said post-increase measurement is less than said pre-increase measurement.

7. The method of claim 1, further comprising:

increasing, by said data transmission server in response to one or more expirations of one or more predefined time intervals of a third plurality of predefined time intervals, said packet size by a second predefined amount, said increasing said packet size including changing said packet size from a pre-increase size to an increased size;

obtaining, by said data transmission server and subsequent to said increasing, a post-increase measurement of said delay;

determining, by said data transmission server, that said post-increase measurement is greater than or equal to a pre-increase measurement associated with said pre-increase size, said pre-increase measurement being said first measurement or said new measurement; and reverting said packet size to said pre-increase size in response to said determining that said post-increase measurement is greater than or equal to said pre-increase measurement.

8. A computing system comprising:

a processor; and a computer-readable memory unit coupled to said processor, wherein said memory unit is a data storage medium containing instructions executable by said processor to implement a method of dynamically adjusting packet size to decrease a delay of a streaming data transmission, said method comprising:

obtaining a first measurement by a measuring computing unit, wherein said first measurement is selected from the group consisting of a delay of a streaming data transmission being sent from a data transmission server to a client computing unit via a plurality of packets and a frequency of damaged packets of said plurality of packets, said damaged packets contributing to said delay of said streaming data transmission, and wherein said measuring computing unit is said data transmission server or said client computing unit;

adjusting a packet size by said data transmission server, said packet size being a size associated with each packet of said plurality of packets, said adjusting said packet size including utilizing said first measurement and facilitating a reduction of said delay, wherein said delay results from noise on one or more communication link segments over which said streaming data transmission is sent from said data transmission server to said client computing unit, and wherein said first measurement is said delay of said streaming data transmission;

obtaining a target value of said delay that indicates a tolerable delay that does not require an adjustment of any packet included in said streaming data transmission;

obtaining a first set of one or more measurements of said delay, said first set of one or more measurements obtained in response to one or more expirations of one or more predefined time intervals of a first plurality of predefined time intervals, and said first set of one or more measurements including said first measurement;

determining that said first measurement is greater than said target value;

decreasing, by said data transmission server, said packet size by a first predefined amount, said decreasing said packet size including changing said packet size from a pre-decrease size to a decreased size, and said decreasing said packet size performed in response to said determining that said first measurement is greater than said target value;

obtaining a new measurement of said delay, said obtaining said new measurement subsequent to said decreasing said packet size and subsequent to a predefined waiting period;

determining a characteristic of said new measurement, wherein said characteristic of said new measurement is selected from the group consisting of said new measurement is less than said target value, said new measurement is less than said first measurement but not less than said target value, and said new measurement is greater than or equal to said first measurement;

obtaining a second set of one or more measurements of said delay if said characteristic is said new measurement is less than said target value, said obtaining said second set of one or more measurements of said delay performed by said measuring computing unit, and said second set of one or more measurements obtained in response to one or more expirations of one or more predefined time intervals of a second plurality of predefined time intervals;

decreasing said packet size by an additional amount if said characteristic is said new measurement is less than said first measurement but not less than said target value, said decreasing said packet size by said additional amount performed by said data transmission server; and restoring said packet size to said pre-decrease size if said characteristic is said new measurement is greater than or equal to said first measurement, said restoring performed by said data transmission server.

9. The computer system of claim 8, wherein said measuring computing unit is said data transmission server, and wherein said method further comprises:
sending, by said data transmission server and to said client computing unit over a primary connection, data of said streaming data transmission, said data of said streaming data transmission including a selected portion of said data of said streaming data transmission, and said primary connection being a Transmission Control Protocol (TCP) connection between said data transmission server and said client computing unit;
receiving, by said data transmission server and from said client computing unit, said selected portion via a pacing connection, said selected portion being received without substantial damage caused by said noise, said selected portion being substantially unique within said data of said streaming data transmission, and said pacing connection being a TCP connection or a User Datagram Protocol (UDP) connection;
identifying, by said data transmission server, an original position of said selected portion in said data of said streaming data transmission; and
computing, by said data transmission server, said delay, said computing including utilizing said original position.

10. The computer system of claim 8, wherein said measuring computing unit is said data transmission server, and wherein said method further comprises:
sending, by said data transmission server and to said client computing unit over a connection, data of said streaming data transmission, said data of said streaming data transmission including a selected portion of said data of said streaming data transmission, said connection being a TCP connection between said data transmission server and said client computing unit;
receiving, by said data transmission server and from said client computing unit, said selected portion of said data of said streaming data transmission via said connection, said selected portion being received without substantial damage caused by said noise, and said selected portion being substantially unique within said data of said streaming data transmission;
identifying, by said data transmission server, an original position of said selected portion in said data of said streaming data transmission; and
computing, by said data transmission server, said delay, said computing including utilizing said original position.

11. The computer system of claim 8, wherein said measuring computing unit is said data transmission server, and wherein said method further comprises:
receiving, by an application of said data transmission server and from a TCP stack, a first timestamp of a transmission of a portion of said streaming data transmission from said data transmission server to said client computing unit;
receiving, by said application of said data transmission server and from said TCP stack, a second timestamp of an acknowledgment packet indicating an acknowledgment of a receipt by said client computing unit of said portion; and
computing said delay, said computing including calculating, by said data transmission server, a difference between said first timestamp and said second timestamp.

12. The computer system of claim 8, wherein said measuring computing unit is said client computing unit, and wherein said method further comprises:
receiving, by said client computing unit and from said data transmission server over a primary connection, data of said streaming data transmission, said data of said streaming data transmission including a selected portion of said data of said streaming data transmission, and said primary connection being a TCP connection between said data transmission server and said client computing unit;
receiving, by said client computing unit and from said data transmission server, said selected portion via a pacing connection, said selected portion being substantially unique within said data of said streaming data transmission, and said pacing connection being a TCP connection or a UDP connection between said data transmission server and said client computing unit;
identifying, by said client computing unit, an original position of said selected portion in said data of said streaming data transmission; and
computing, by said client computing unit, said delay, said computing including utilizing said original position.

13. The computer system of claim 8, wherein said method further comprises:
increasing, by said data transmission server in response to one or more expirations of one or more predefined time intervals of a third plurality of predefined time intervals, said packet size by a second predefined amount, said increasing said packet size including changing said packet size from a pre-increase size to an increased size;
obtaining, by said data transmission server and subsequent to said increasing, a post-increase measurement of said delay;
determining, by said data transmission server, that said post-increase measurement is less than a pre-increase measurement associated with said pre-increase size, said pre-increase measurement being said first measurement or said new measurement; and
maintaining said packet size at said increased size in response to said determining that said post-increase measurement is less than said pre-increase measurement.

14. The computer system of claim 8, wherein said method further comprises:
increasing, by said data transmission server in response to one or more expirations of one or more predefined time intervals of a third plurality of predefined time intervals, said packet size by a second predefined amount, said increasing said packet size including changing said packet size from a pre-increase size to an increased size;
obtaining, by said data transmission server and subsequent to said increasing, a post-increase measurement of said delay;
determining, by said data transmission server, that said post-increase measurement is greater than or equal to a pre-increase measurement associated with said pre-increase size, said pre-increase measurement being said first measurement or said new measurement; and
reverting said packet size to said pre-increase size in response to said determining that said post-increase measurement is greater than or equal to said pre-increase measurement.

15. A computer program product comprising a non-transitory computer readable storage medium having computer readable program code stored therein, said computer readable program code containing instructions executable by a processor of a computer system to implement a method of dynamically adjusting packet size to decrease a delay of a streaming data transmission, said method comprising:

obtaining a first measurement by a measuring computing unit, wherein said first measurement is selected from the group consisting of a delay of a streaming data transmission being sent from a data transmission server to a client computing unit via a plurality of packets and a frequency of damaged packets of said plurality of packets, said damaged packets contributing to said delay of said streaming data transmission, and wherein said measuring computing unit is said data transmission server or said client computing unit; and adjusting a packet size by said data transmission server, said packet size being a size associated with each packet of said plurality of packets, wherein said adjusting said packet size includes utilizing said first measurement and computer-usable code for facilitating a reduction of said delay, wherein said delay results from noise on one or more communication link segments over which said streaming data transmission is sent from said data transmission server to said client computing unit, and wherein said first measurement is said delay of said streaming data transmission;

obtaining a target value of said delay that indicates a tolerable delay that does not require an adjustment of any packet included in said streaming data transmission;

obtaining a first set of one or more measurements of said delay, said first set of one or more measurements obtained in response to one or more expirations of one or more predefined time intervals of a first plurality of predefined time intervals, and said first set of one or more measurements including said first measurement;

determining that said first measurement is greater than said target value;

decreasing, by said data transmission server, said packet size by a first predefined amount, wherein said decreasing said packet size includes changing said packet size from a pre-decrease size to a decreased size, wherein said decreasing said packet size is performed in response to said determining that said first measurement is greater than said target value;

obtaining a new measurement of said delay, said obtaining said new measurement being subsequent to said decreasing said packet size and subsequent to a predefined waiting period;

determining a characteristic of said new measurement, wherein said characteristic of said new measurement is selected from the group consisting of said new measurement is less than said target value, said new measurement is less than said first measurement but not less than said target value, and said new measurement is greater than or equal to said first measurement;

obtaining a second set of one or more measurements of said delay if said characteristic is said new measurement is less than said target value, said obtaining said second set of one or more measurements of said delay performed by said measuring computing unit, and said second set of one or more measurements obtained in response to one or more expirations of one or more predefined time intervals of a second plurality of predefined time intervals;

decreasing said packet size by an additional amount if said characteristic is said new measurement is less than said first measurement but not less than said target value, said decreasing said packet size by said additional amount performed by said data transmission server; and restoring said packet size to said pre-decrease size if said characteristic is said new measurement is greater than or equal to said first measurement, said restoring performed by said data transmission server.

16. The program product of claim 15, wherein said measuring computing unit is said data transmission server, and wherein said method comprises:

sending, by said data transmission server and to said client computing unit over a primary connection, data of said streaming data transmission, said data of said streaming data transmission including a selected portion of said data of said streaming data transmission, and said primary connection being a Transmission Control Protocol (TCP) connection between said data transmission server and said client computing unit;

receiving, by said data transmission server and from said client computing unit, said selected portion via a pacing connection, said selected portion being received without substantial damage caused by said noise, said selected portion being substantially unique within said data of said streaming data transmission, and said pacing connection being a TCP connection or a User Datagram Protocol (UDP) connection;

identifying, by said data transmission server, an original position of said selected portion in said data of said streaming data transmission; and computing, by said data transmission server, said delay, wherein said computing said delay includes utilizing said original position.

17. The program product of claim 15, wherein said measuring computing unit is said data transmission server, and wherein said method further comprises:

sending, by said data transmission server and to said client computing unit over a connection, data of said streaming data transmission, said data of said streaming data transmission including a selected portion of said data of said streaming data transmission, said connection being a TCP connection between said data transmission server and said client computing unit;

receiving, by said data transmission server and from said client computing unit, said selected portion of said data of said streaming data transmission via said connection, said selected portion being received without substantial damage caused by said noise, and said selected portion being substantially unique within said data of said streaming data transmission;

identifying, by said data transmission server, an original position of said selected portion in said data of said streaming data transmission; and computing, by said data transmission server, said delay, wherein said computing said delay includes utilizing said original position.

18. The program product of claim 15, wherein said measuring computing unit is said data transmission server, and wherein said method further comprises:

receiving, by an application of said data transmission server and from a TCP stack, a first timestamp of a transmission of a portion of said streaming data transmission from said data transmission server to said client computing unit;

receiving, by said application of said data transmission server and from said TCP stack, a second timestamp of an acknowledgment packet indicating an acknowledgment of a receipt by said client computing unit of said portion; and computing said delay, wherein said computing said delay includes calculating, by said data transmission server, a difference between said first timestamp and said second timestamp.

19. The program product of claim 15, wherein said measuring computing unit is said client computing unit, and wherein said method further comprises:
   receiving, by said client computing unit and from said data transmission server over a primary connection, data of said streaming data transmission, said data of said streaming data transmission including a selected portion of said data of said streaming data transmission, and said primary connection being a TCP connection between said data transmission server and said client computing unit;
   receiving, by said client computing unit and from said data transmission server, said selected portion via a pacing connection, said selected portion being substantially unique within said data of said streaming data transmission, and said pacing connection being a TCP connection or a UDP connection between said data transmission server and said client computing unit;
   identifying, by said client computing unit, an original position of said selected portion in said data of said streaming data transmission; and
   computing, by said client computing unit, said delay, wherein said computing said delay includes utilizing said original position.

20. The program product of claim 15, wherein said method further comprises:
   increasing, by said data transmission server in response to one or more expirations of one or more predefined time intervals of a third plurality of predefined time intervals, said packet size by a second predefined amount, wherein said increasing said packet size includes changing said packet size from a pre-increase size to an increased size;
   obtaining, by said data transmission server and subsequent to said increasing, a post-increase measurement of said delay;
   determining, by said data transmission server, that said post-increase measurement is less than a pre-increase measurement associated with said pre-increase size, said pre-increase measurement being said first measurement or said new measurement; and
   maintaining said packet size at said increased size in response to said determining that said post-increase measurement is less than said pre-increase measurement.

21. The program product of claim 15, wherein said method further comprises:
   increasing, by said data transmission server in response to one or more expirations of one or more predefined time intervals of a third plurality of predefined time intervals, said packet size by a second predefined amount, wherein said increasing said packet size includes changing said packet size from a pre-increase size to an increased size;
   obtaining, by said data transmission server and subsequent to said increasing, a post-increase measurement of said delay;
   determining, by said data transmission server, that said post-increase measurement is greater than or equal to a pre-increase measurement associated with said pre-increase size, said pre-increase measurement being said first measurement or said new measurement; and
   reverting said packet size to said pre-increase size in response to said determining that said post-increase measurement is greater than or equal to said pre-increase measurement.

22. A process for supporting computing infrastructure, said process comprising providing at least one support service for at least one of creating, integrating, hosting, maintaining, and deploying computer-readable code in a computing system comprising a processor, wherein said computer-readable code includes instructions that when carried out by said processor, causes the computing system to specify a method of dynamically adjusting packet size to decrease a delay of a streaming data transmission, said method comprising:
   obtaining a first measurement by a measuring computing unit, wherein said first measurement is selected from the group consisting of a delay of a streaming data transmission being sent from a data transmission server to a client computing unit via a plurality of packets and a frequency of damaged packets of said plurality of packets, said damaged packets contributing to said delay of said streaming data transmission, and wherein said measuring computing unit is said data transmission server or said client computing unit;
   adjusting a packet size by said data transmission server, said packet size being a size associated with each packet of said plurality of packets, said adjusting said packet size including utilizing said first measurement and facilitating a reduction of said delay,
   wherein said delay results from noise on one or more communication link segments over which said streaming data transmission is sent from said data transmission server to said client computing unit, and
   wherein said first measurement is said delay of said streaming data transmission;
   obtaining a target value of said delay that indicates a tolerable delay that does not require an adjustment of any packet included in said streaming data transmission;
   obtaining a first set of one or more measurements of said delay, said first set of one or more measurements obtained in response to one or more expirations of one or more predefined time intervals of a first plurality of predefined time intervals, and said first set of one or more measurements including said first measurement;
   determining that said first measurement is greater than said target value;
   decreasing, by said data transmission server, said packet size by a first predefined amount, said decreasing said packet size including changing said packet size from a pre-decrease size to a decreased size, and said decreasing said packet size performed in response to said determining that said first measurement is greater than said target value;
   obtaining a new measurement of said delay, said obtaining said new measurement subsequent to said decreasing said packet size and subsequent to a predefined waiting period;
   determining a characteristic of said new measurement, wherein said characteristic of said new measurement is selected from the group consisting of said new measurement is less than said target value, said new measurement is less than said first measurement but not less than said target value, and said new measurement is greater than or equal to said first measurement;
   obtaining a second set of one or more measurements of said delay if said characteristic is said new measurement is less than said target value, said obtaining said second set of one or more measurements of said delay performed by said measuring computing unit, and said second set of one or more measurements obtained in response to one or more expirations of one or more predefined time intervals of a second plurality of predefined time intervals;

decreasing said packet size by an additional amount if said characteristic is said new measurement is less than said first measurement but not less than said target value, said decreasing said packet size by said additional amount performed by said data transmission server; and restoring said packet size to said pre-decrease size if said characteristic is said new measurement is greater than or equal to said first measurement, said restoring performed by said data transmission server.

23. The process of claim 22, wherein said measuring computing unit is said data transmission server, and wherein said method further comprises:

sending, by said data transmission server and to said client computing unit over a primary connection, data of said streaming data transmission, said data of said streaming data transmission including a selected portion of said data of said streaming data transmission, and said primary connection being a Transmission Control Protocol (TCP) connection between said data transmission server and said client computing unit;

receiving, by said data transmission server and from said client computing unit, said selected portion via a pacing connection, said selected portion being received without substantial damage caused by said noise, said selected portion being substantially unique within said data of said streaming data transmission, and said pacing connection being a TCP connection or a User Datagram Protocol (UDP) connection;

identifying, by said data transmission server, an original position of said selected portion in said data of said streaming data transmission; and computing, by said data transmission server, said delay, said computing including utilizing said original position.

24. The process of claim 22, wherein said measuring computing unit is said data transmission server, and wherein said method further comprises:

sending, by said data transmission server and to said client computing unit over a connection, data of said streaming data transmission, said data of said streaming data transmission including a selected portion of said data of said streaming data transmission, said connection being a TCP connection between said data transmission server and said client computing unit;

receiving, by said data transmission server and from said client computing unit, said selected portion of said data of said streaming data transmission via said connection, said selected portion being received without substantial damage caused by said noise, and said selected portion being substantially unique within said data of said streaming data transmission;

identifying, by said data transmission server, an original position of said selected portion in said data of said streaming data transmission; and computing, by said data transmission server, said delay, said computing including utilizing said original position.

25. The process of claim 22, wherein said measuring computing unit is said data transmission server, and wherein said method further comprises:

receiving, by an application of said data transmission server and from a TCP stack, a first timestamp of a transmission of a portion of said streaming data transmission from said data transmission server to said client computing unit;

receiving, by said application of said data transmission server and from said TCP stack, a second timestamp of an acknowledgment packet indicating an acknowledgment of a receipt by said client computing unit of said portion; and computing said delay, said computing including calculating, by said data transmission server, a difference between said first timestamp and said second timestamp.

26. The process of claim 22, wherein said measuring computing unit is said client computing unit, and wherein said method further comprises:

receiving, by said client computing unit and from said data transmission server over a primary connection, data of said streaming data transmission, said data of said streaming data transmission including a selected portion of said data of said streaming data transmission, and said primary connection being a TCP connection between said data transmission server and said client computing unit;

receiving, by said client computing unit and from said data transmission server, said selected portion via a pacing connection, said selected portion being substantially unique within said data of said streaming data transmission, and said pacing connection being a TCP connection or a UDP connection between said data transmission server and said client computing unit;

identifying, by said client computing unit, an original position of said selected portion in said data of said streaming data transmission; and computing, by said client computing unit, said delay, said computing including utilizing said original position.

27. The process of claim 22, wherein said method further comprises:

increasing, by said data transmission server in response to one or more expirations of one or more predefined time intervals of a third plurality of predefined time intervals, said packet size by a second predefined amount, said increasing said packet size including changing said packet size from a pre-increase size to an increased size;

obtaining, by said data transmission server and subsequent to said increasing, a post-increase measurement of said delay;

determining, by said data transmission server, that said post-increase measurement is less than a pre-increase measurement associated with said pre-increase size, said pre-increase measurement being said first measurement or said new measurement; and maintaining said packet size at said increased size in response to said determining that said post-increase measurement is less than said pre-increase measurement.

28. The process of claim 22, wherein said method further comprises:

increasing, by said data transmission server in response to one or more expirations of one or more predefined time intervals of a third plurality of predefined time intervals, said packet size by a second predefined amount, said increasing said packet size including changing said packet size from a pre-increase size to an increased size;

obtaining, by said data transmission server and subsequent to said increasing, a post-increase measurement of said delay;

determining, by said data transmission server, that said post-increase measurement is greater than or equal to a pre-increase measurement associated with said pre-increase size, said pre-increase measurement being said first measurement or said new measurement; and reverting said packet size to said pre-increase size in response to said determining that said post-increase measurement is greater than or equal to said pre-increase measurement.

* * * * *